United States Patent
Noh et al.

(10) Patent No.: US 8,958,370 B2
(45) Date of Patent: Feb. 17, 2015

(54) METHOD AND APPARATUS FOR CONTROLLING TRANSMISSION POWER IN WIRELESS COMMUNICATION SYSTEM

(75) Inventors: Min Seok Noh, Anyang-si (KR); Jae Hoon Chung, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 182 days.

(21) Appl. No.: 13/816,165

(22) PCT Filed: Aug. 10, 2011

(86) PCT No.: PCT/KR2011/005849
§ 371 (c)(1),
(2), (4) Date: Feb. 8, 2013

(87) PCT Pub. No.: WO2012/020990
PCT Pub. Date: Feb. 16, 2012

(65) Prior Publication Data
US 2013/0148614 A1      Jun. 13, 2013

Related U.S. Application Data

(60) Provisional application No. 61/372,451, filed on Aug. 10, 2010.

(30) Foreign Application Priority Data

Aug. 10, 2010 (KR) .................. 10-2011-0079445

(51) Int. Cl.
*H04W 4/00* (2009.01)
*H04W 52/54* (2009.01)
(Continued)

(52) U.S. Cl.
CPC .............. *H04W 52/54* (2013.01); *H04L 5/001* (2013.01); *H04L 5/0053* (2013.01); *H04L 5/006* (2013.01); *H04W 52/16* (2013.01); *H04L 5/0057* (2013.01); *H04W 72/0453* (2013.01); *Y02B 60/50* (2013.01)
USPC ............ 370/328; 370/252; 455/522; 714/748

(58) Field of Classification Search
None
See application file for complete search history.

(56) References Cited

U.S. PATENT DOCUMENTS

8,811,249 B2 * 8/2014 Seo et al. .................. 370/311
2010/0195575 A1 * 8/2010 Papasakellariou et al. ... 370/328
(Continued)

FOREIGN PATENT DOCUMENTS

KR  10-2009-0032929 A1  4/2009
KR  10-2010-0014091 A   2/2010
KR  10-2010-0053405 A   5/2010

*Primary Examiner* — Bob Phunkulh
(74) *Attorney, Agent, or Firm* — Birch, Stewart, Kolasch & Birch, LLP

(57) ABSTRACT

Provided is a method and apparatus for controlling transmission power in a wireless communication system. A terminal sets transmission power of a physical uplink control channel (PUCCH). Among a plurality of physical uplink shared channels (PUSCHs), at least one PUSCH to which uplink control information (UCI) is not mapped is decreased in transmission power based on a maximum transmission power of the terminal and the transmission power of the PUCCH, and transmission power of at least one second PUSCH, of the plurality of PUSCHs to which UCI is mapped, is set. At this time, the UCI and uplink data are transmitted through the PUCCH, the at least one first PUSCH, and the at least one second PUSCH; and the at least one first PUSCH and the at least one second PUSCH are allocated to component carriers (CCs) of a plurality of uplinks (ULs).

14 Claims, 20 Drawing Sheets

(51) Int. Cl.
*H04L 5/00* (2006.01)
*H04W 52/16* (2009.01)
*H04W 72/04* (2009.01)

(56) References Cited

U.S. PATENT DOCUMENTS

| | | | |
|---|---|---|---|
| 2010/0246463 A1* | 9/2010 | Papasakellariou et al. | 370/311 |
| 2011/0038271 A1* | 2/2011 | Shin et al. | 370/252 |
| 2011/0064042 A1 | 3/2011 | Kim et al. | |
| 2011/0141928 A1* | 6/2011 | Shin et al. | 370/252 |
| 2011/0228709 A1 | 9/2011 | Kim et al. | |
| 2011/0268045 A1* | 11/2011 | Heo et al. | 370/329 |
| 2011/0268075 A1* | 11/2011 | Heo et al. | 370/329 |
| 2011/0280169 A1* | 11/2011 | Seo et al. | 370/311 |
| 2011/0287804 A1* | 11/2011 | Seo et al. | 455/522 |
| 2012/0099553 A1* | 4/2012 | Aiba et al. | 370/329 |
| 2012/0182949 A1* | 7/2012 | Aiba et al. | 370/329 |
| 2012/0188947 A1* | 7/2012 | Larsson et al. | 370/328 |

* cited by examiner (a) from DFT unit → to IFFT unit (b) from DFT unit → to IFFT unit (a)

(b)

METHOD AND APPARATUS FOR CONTROLLING TRANSMISSION POWER IN WIRELESS COMMUNICATION SYSTEM

This application is the National Phase of PCT/KR2011/005849 filed on Aug. 10, 2011, which claims priority under 35 U.S.C. 119(e) to U.S. Provisional Application No. 61/372,451 filed on Aug. 10, 2010, and under U.S.C. 119(a) to Patent Application No. 10-2011-0079445 filed in the Republic of Korea on Aug. 10, 2011, all of which are hereby expressly incorporated by reference into the present application.

BACKGROUND OF THE INVENTION

1. Field of the Invention

The present invention relates to wireless communication, and more particularly, to a method and apparatus for controlling transmission power in a wireless communication system.

2. Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

An uplink control information (UCI) can be transmitted through an uplink control channel, i.e., a physical uplink control channel (PUCCH). The UCI may include various types of information such as a scheduling request (SR), an acknowledgement/non-acknowledgement (ACK/NACK) for a hybrid automatic repeat request (HARQ), a channel quality indicator (CQI), a precoding matrix indicator (PMI), a rank indicator (RI), etc. The PUCCH carries various types of control information according to a format. Transmission of the UCI through the PUCCH may be found in the section 10 of $3^{rd}$ generation partnership project (3GPP) TS 36.213 V8.8.0 (2009-09).

Meanwhile, a carrier aggregation (CA) system implies a system which supports a broadband by aggregating one or more carriers having a bandwidth narrower than that of a desired broadband when a wireless communication system intends to support the broadband. In the CA system, a user equipment can simultaneously transmit or receive one or a plurality of carriers according to capacity. The conventional transmission technique can be newly defined in the CA system. The CA system may be found in 3GPP TR 36.815 V9.0.0 (2010-3).

In a carrier aggregation system, a user equipment (UE) can periodically transmit the UCI through a plurality of component carriers (CCs), or can aperiodically transmit the CQI. In this case, maximum transmission power of the UE can be limited, and the UE can allocate and/or control power for each UL transmission channel, i.e., a PUCCH and a physical uplink shared channel (PUSCH).

There is a need for a method for properly allocating power for each UL channel.

SUMMARY OF THE INVENTION

The present invention provides a method and apparatus for controlling transmission power in a wireless communication system. The present invention provides a method and apparatus for controlling transmission power of each uplink channel when periodic uplink control information (UCI) and aperiodic channel quality indicator (CQI) are transmitted through a plurality of component carriers (CCs).

In an aspect, a method of controlling transmission power by a terminal in a wireless communication system is provided. The method includes determining transmission power of a physical uplink control channel (PUCCH), determining transmission power of at least one first uplink shared channel (PUSCH) to which an uplink control information (UCI) is not mapped by scaling down the transmission power thereof among a plurality of PUSCHs on the basis of maximum transmission power of the terminal and the transmission power of the PUCCH, determining transmission power of at least one second PUSCH to which the UCI is mapped among the plurality of PUSCHs, and transmitting the UCI and uplink (UL) data through the PUCCH, the at least one first PUSCH, and the at least one second PUSCH. The at least one first PUSCH and the at least one second PUSCH are allocated to a plurality of UL component carriers (CCs).

The transmission power of the at least one first PUSCH may be determined by being scaled down to satisfy the equation of $$\sum_c w_c \cdot P_{PUSCHc}(i) \le P_{CMAX} - P_{PUCCH}(i),$$

where $w_c$ is a scaling factor for scaling down the transmission power of the at least one first PUSCH, c is an index of a UL CC, $P_{PUSCHc}(i)$ is the transmission power of the at least one first PUSCH, $P_{CMAX}$ is the maximum transmission power of the terminal, and $P_{PUCCH}(i)$ is the transmission power of the PUCCH.

The UCI may be any one of a periodic UCI, an aperiodic channel quality indicator (CQI), and a jointly encoded periodic UCI and aperiodic CQI.

The transmission power of the at least one second PUSCH may be evenly distributed to the at least one second PUSCH.

The transmission power of the at least one second PUSCH may be allocated to the at least one second PUSCH on the basis of a pre-set priority.

The transmission power of the second PUSCH allocated to a UL primary CC (PCC) may be preferentially allocated among the at least one second PUSCH.

The priority may be set explicitly by physical downlink control channel (PDCCH) signaling or radio resource control (RRC) signaling.

The priority may be set implicitly on the basis of a size of a transmission block (TB) or an index of a plurality of UL CCs to which the at least one second PUSCH is allocated.

The transmission power of the second PUSCH to which an aperiodic CQI may be mapped is preferentially allocated among the at least one second PUSCH.

In another aspect, a terminal in a wireless communication system is provided. The terminal includes a radio frequency (RF) unit for transmitting or receiving a radio signal, and a processor coupled to the RF unit. The processor is configured for determining transmission power of a physical uplink control channel (PUCCH), determining transmission power of at least one first uplink shared channel (PUSCH) to which an uplink control information (UCI) is not mapped by scaling down the transmission power thereof among a plurality of PUSCHs on the basis of maximum transmission power of the terminal and the transmission power of the PUCCH, determining transmission power of at least one second PUSCH to which the UCI is mapped among the plurality of PUSCHs, and transmitting the UCI and uplink (UL) data through the PUCCH, the at least one first PUSCH, and the at least one second PUSCH. The at least one first PUSCH and the at least one second PUSCH are allocated to a plurality of UL component carriers (CCs).

Transmission power of each uplink channel can be properly allocated when maximum transmission power of a user equipment is limited.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
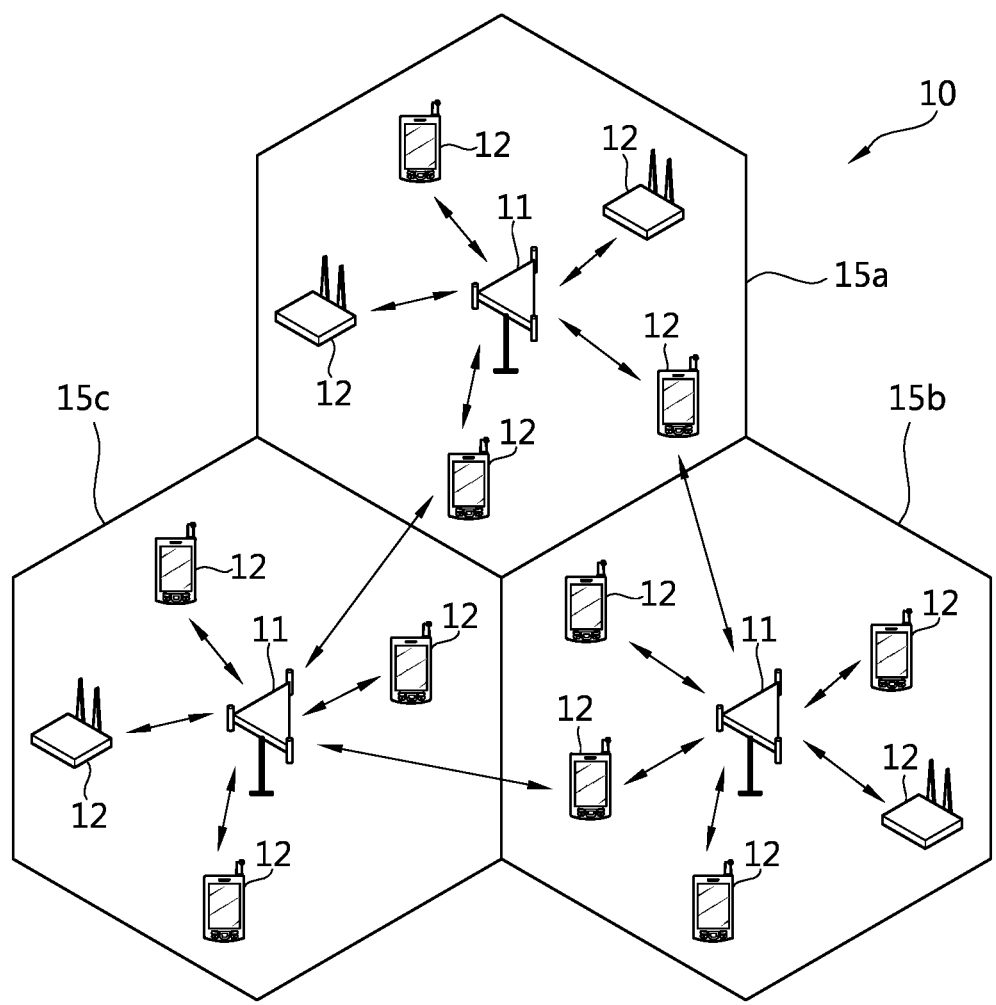
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
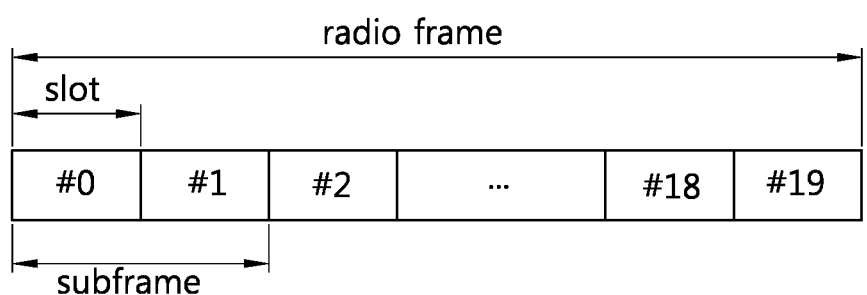
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
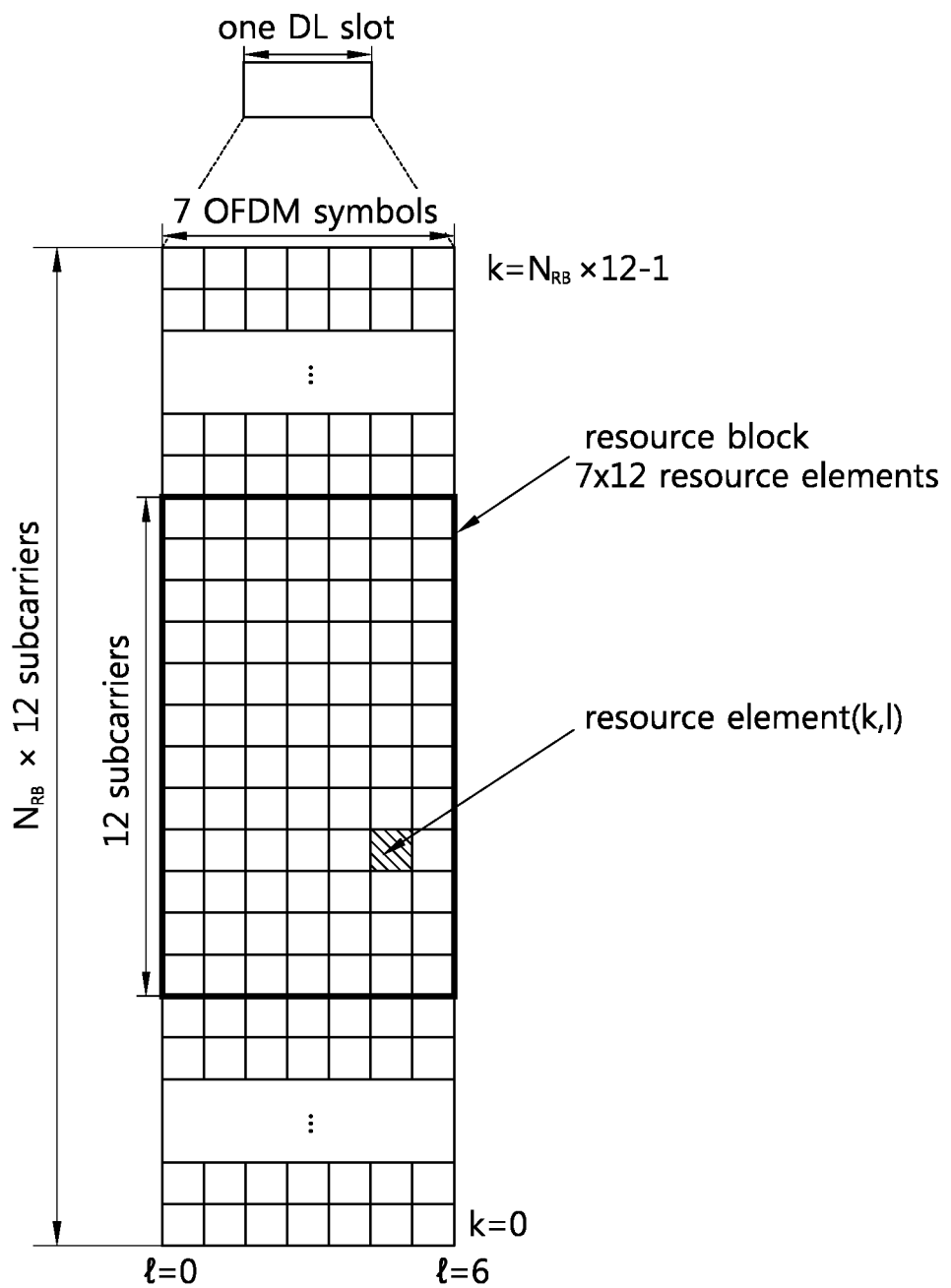
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k, l) in the slot. Here, k (k=0, ..., $N_{RB}$×12−1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
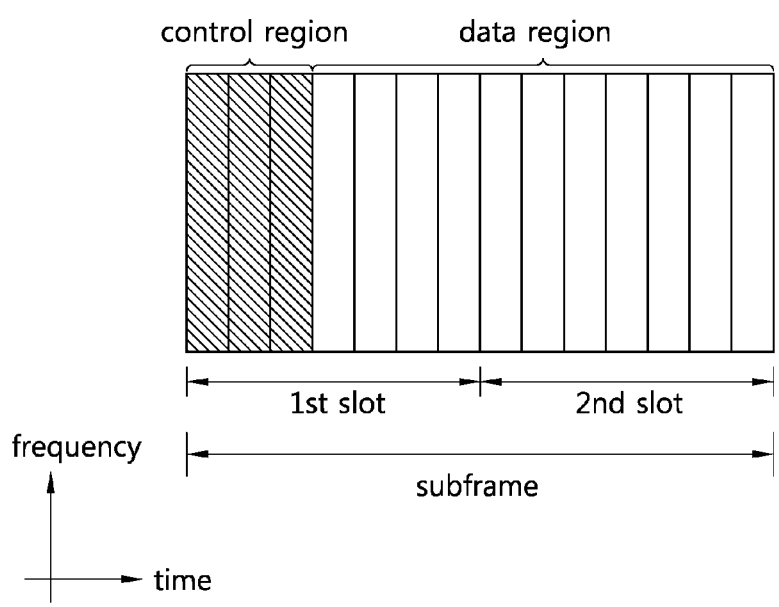
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC. The DCI to which the CRC is attached may be transmitted by using channel coding and rate matching.

Figure 5:
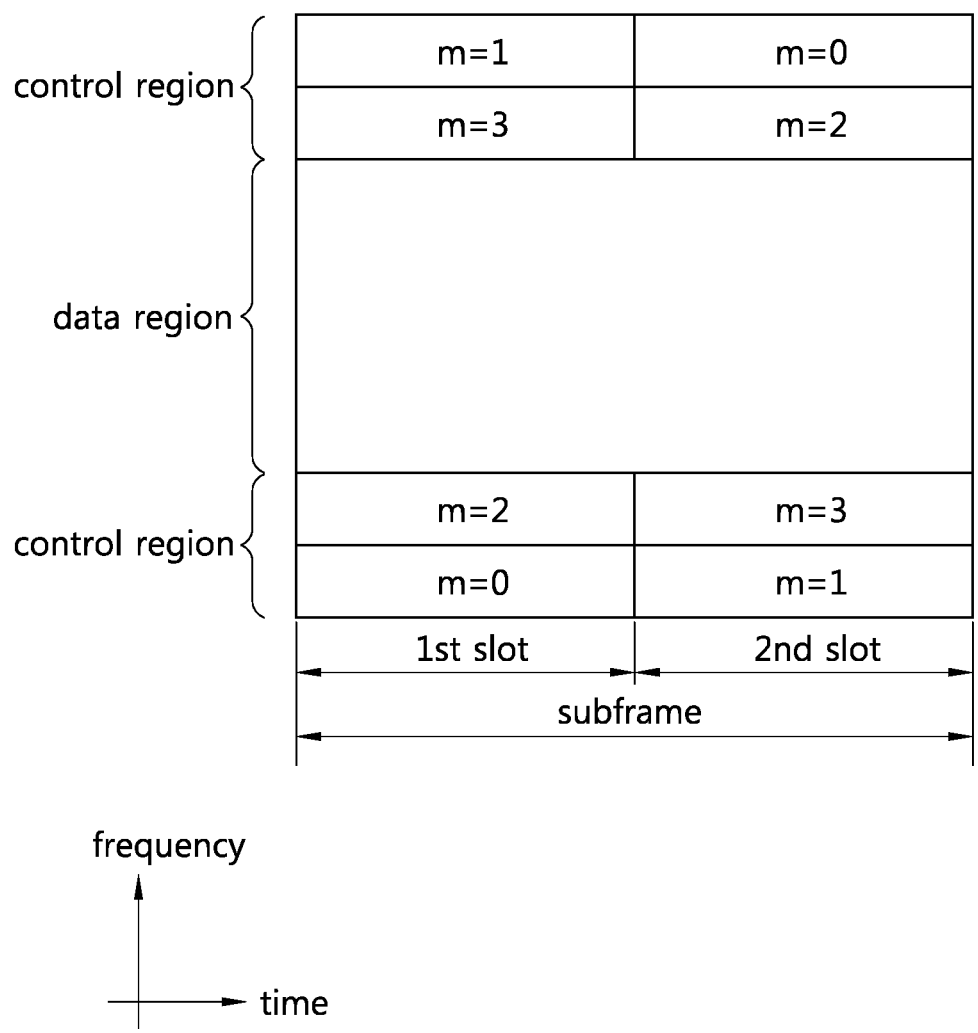
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TU. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Figure 6:
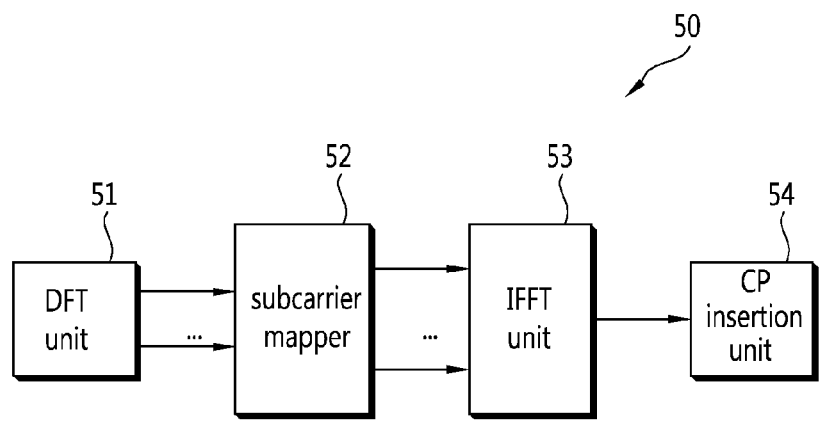
FIG. 6 shows an example of the structure of a transmitter in an SC-FDMA system.

FIG. 6 shows an example of the structure of a transmitter in an SC-FDMA system.

Referring to FIG. 6, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

Figure 7:
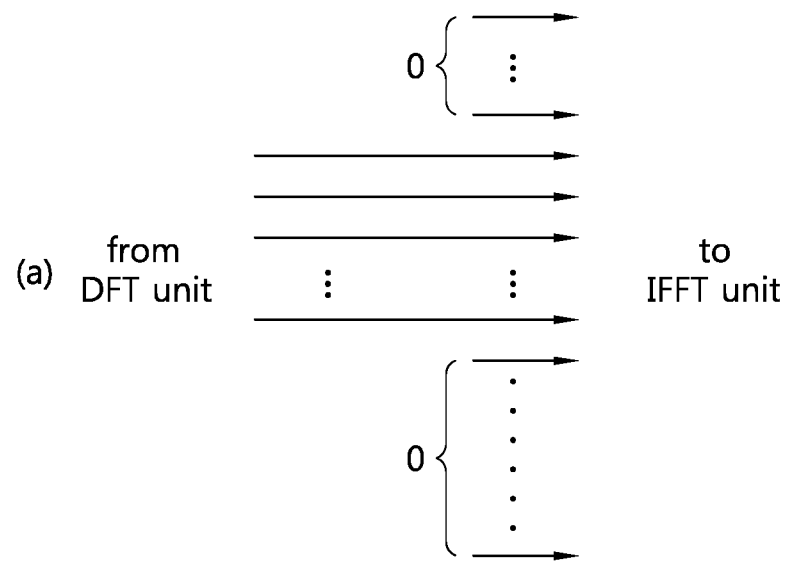
FIG. 7 shows an example of a scheme in which the subcarrier mapper maps the complex-valued symbols to the respective subcarriers of the frequency domain.
Figure 7:
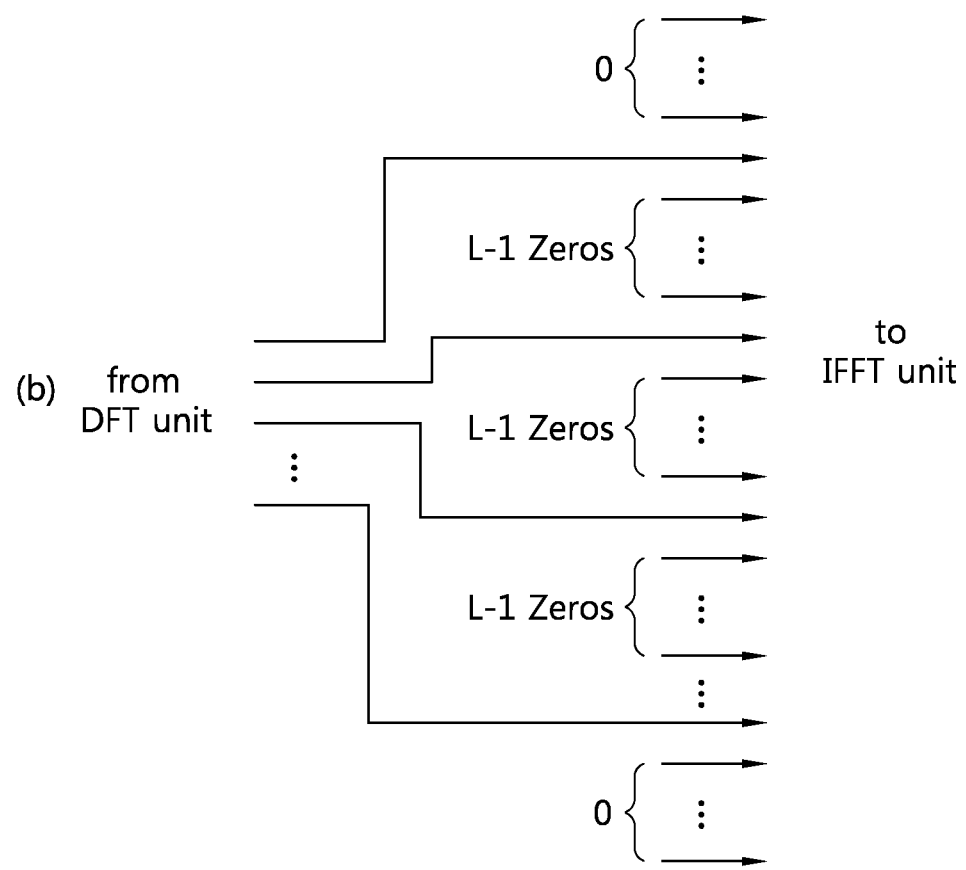

FIG. 7 shows an example of a scheme in which the subcarrier mapper maps the complex-valued symbols to the respective subcarriers of the frequency domain. Referring to FIG. 7(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 7(b), the subcarrier mapper inserts an (L-1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 7(a) or the distributed mapping scheme as in FIG. 7(b), a single carrier characteristic is maintained.

Figure 8:
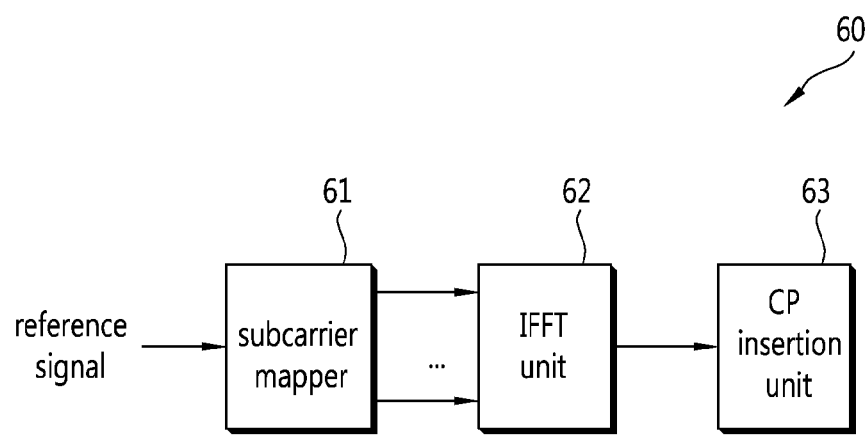
FIG. 8 shows an example of the structure of a reference signal transmitter for demodulation.

FIG. 8 shows an example of the structure of a reference signal transmitter for demodulation.

Referring to FIG. 8, the reference signal transmitter 60 includes a subcarrier mapper 61, an IFFT unit 62, and a CP insertion unit 63. Unlike the transmitter 50 of FIG. 6, in the reference signal transmitter 60, a reference signal is directly generated in the frequency domain without passing through the DFT unit 51 and then mapped to subcarriers through the subcarrier mapper 61. Here, the subcarrier mapper may map the reference signal to the subcarriers using the localized mapping scheme of FIG. 7(a).

Figure 9:
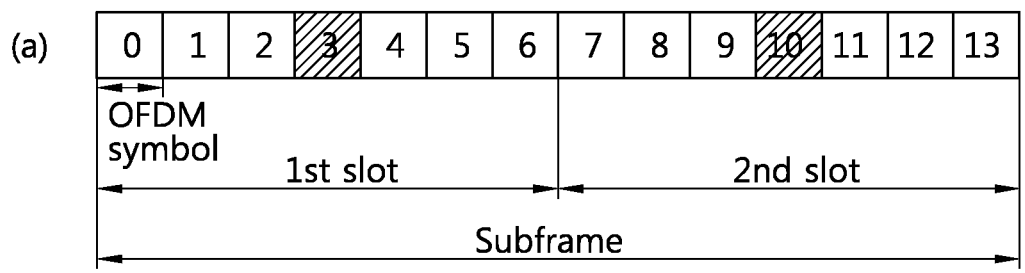
FIG. 9 shows examples of a subframe through which a reference signal is transmitted.
Figure 9:
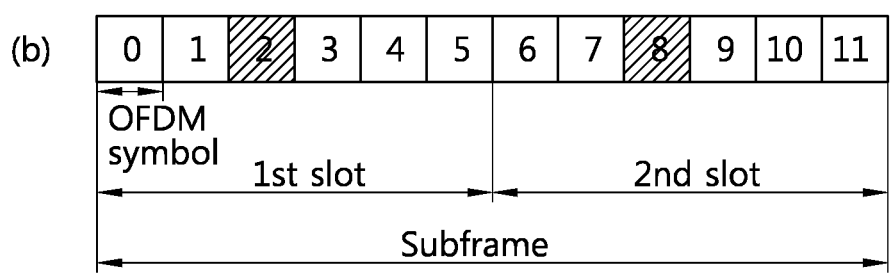

FIG. 9 shows examples of a subframe through which a reference signal is transmitted. The structure of a subframe in FIG. 9(a) shows a case of a normal CP. The subframe includes a first slot and a second slot. Each of the first slot and the second slot includes 7 OFDM symbols. The 14 OFDM symbols within the subframe are assigned respective symbol indices 0 to 13. Reference signals may be transmitted through the OFDM symbols having the symbol indices 3 and 10. The reference signals may be transmitted using a sequence. A Zadoff-Chu (ZC) sequence may be used as the reference signal sequence. A variety of ZC sequences may be generated according to a root index and a cyclic shift value. A BS may estimate the channels of a plurality of UEs through an orthogonal sequence or a quasi-orthogonal sequence by allocating different cyclic shift values to the UEs. The positions of the reference signals occupied in the two slots within the subframe in the frequency domain may be identical with each other or different from each other. In the two slots, the same reference signal sequence is used. Data may be transmitted through the remaining SC-FDMA symbols other than the SC-FDMA symbols through which the reference signals are transmitted. The structure of a subframe in FIG. 9(b) shows a case of an extended CP. The subframe includes a first slot and a second slot. Each of the first slot and the second slot includes 6 SC-FDMA symbols. The 12 SC-FDMA symbols within the subframe are assigned symbol indices 0 to 11. Reference signals are transmitted through the SC-FDMA symbols having the symbol indices 2 and 8. Data is transmitted through the remaining SC-FDMA symbols other than the SC-FDMA symbols through which the reference signals are transmitted.

Although not shown in FIG. 9, a sounding reference signal (SRS) may be transmitted through the OFDM symbols within the subframe. The SRS is a reference signal for UL scheduling which is transmitted from UE to a BS. The BS estimates a UL channel through the received SRS and uses the estimated UL channel in UL scheduling.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 10:
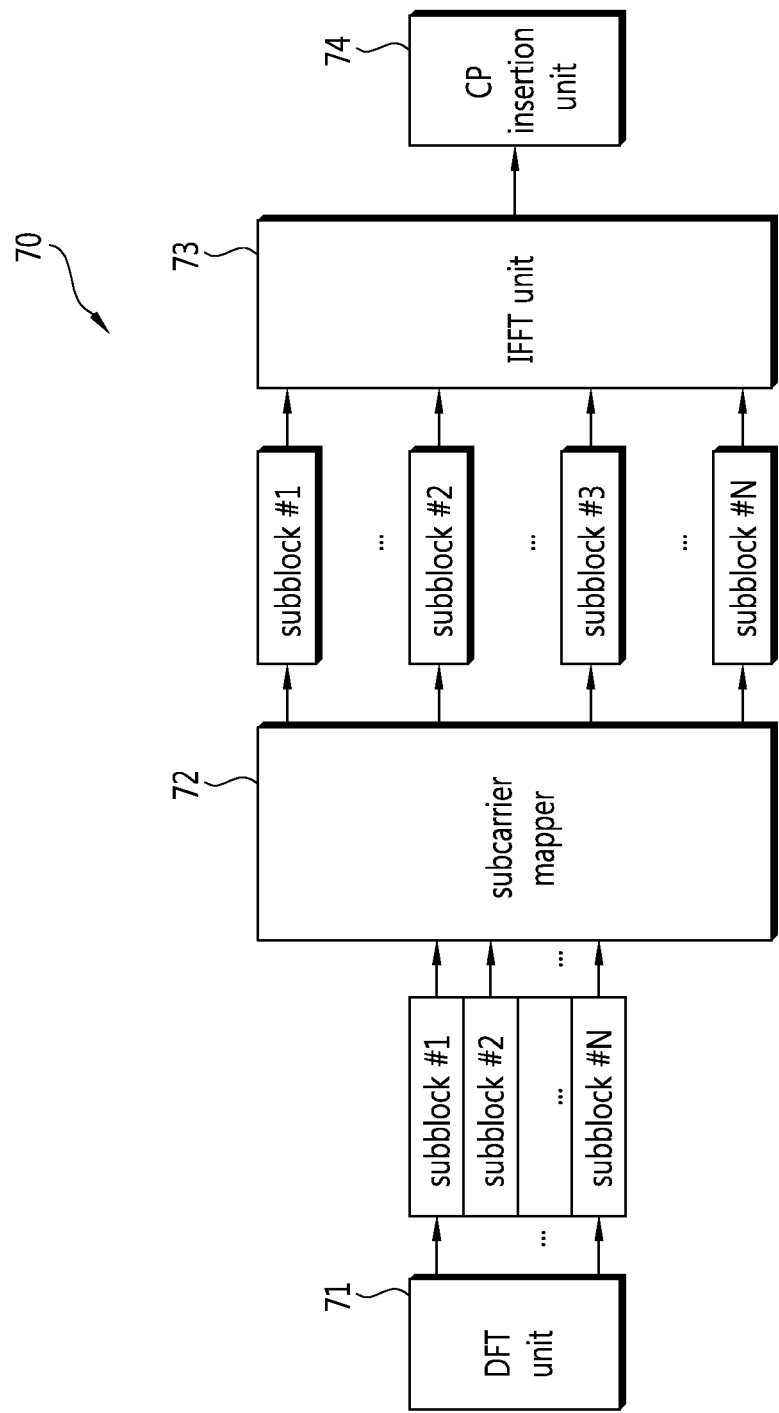
FIG. 10 shows an example of a transmitter using the clustered DFT-s OFDM transmission scheme.

FIG. 10 shows an example of a transmitter using the clustered DFT-s OFDM transmission scheme. Referring to FIG. 10, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, ..., a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 10 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 10, a time domain signal is generated through one IFFT unit 73. Accordingly, in order for the transmitter 70 of FIG. 10 to be used in a multi-carrier transmitter, subcarrier intervals between contiguous carriers in a contiguous carrier allocation situation must be aligned.

Figure 11:
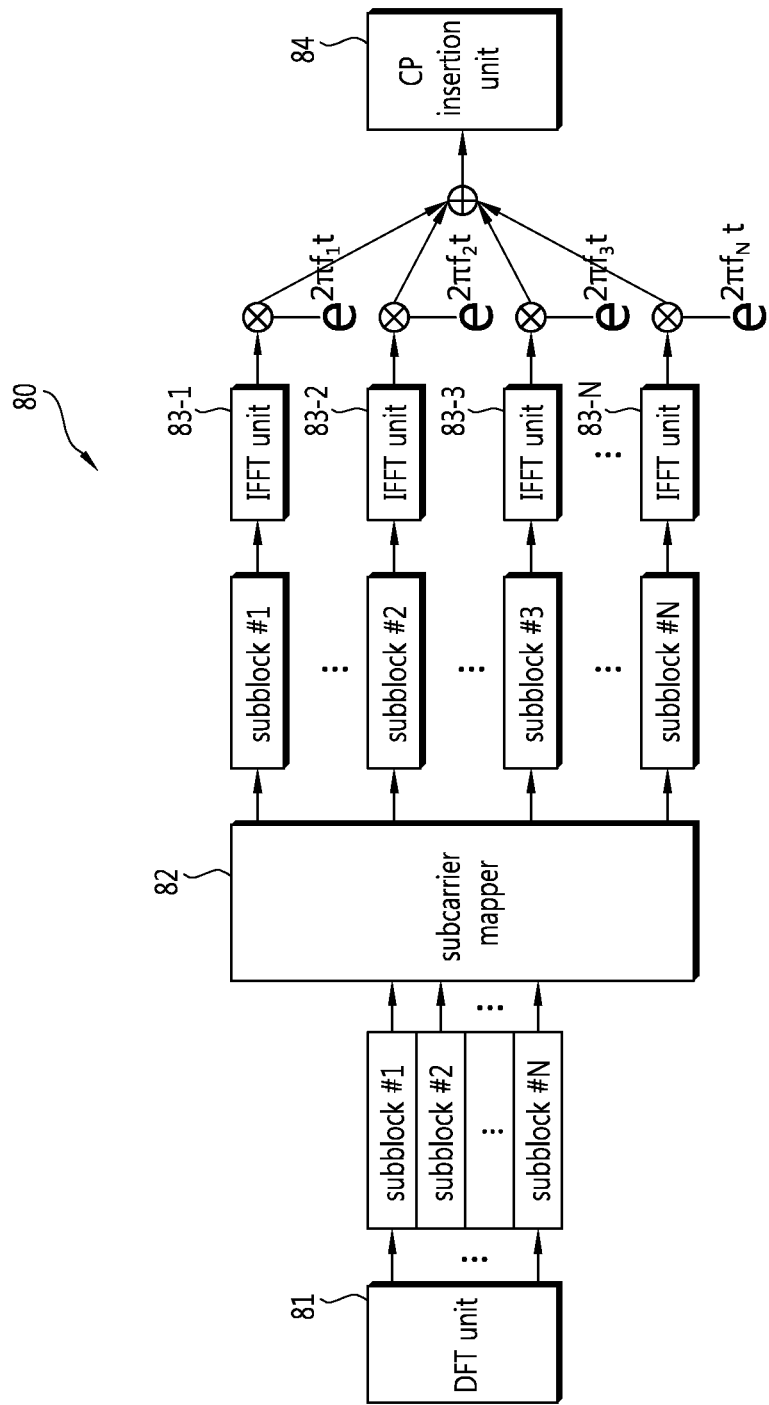
FIG. 11 shows another example of a transmitter using the clustered DFT-s OFDM transmission scheme.

FIG. 11 shows another example of a transmitter using the clustered DFT-s OFDM transmission scheme. Referring to FIG. 11, the transmitter 80 includes a DFT unit 81, a subcarrier mapper 82, a plurality of IFFT units 83-1, 83-2, ..., 83-N (N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An $n^{th}$ IFFT unit 38-$n$ outputs an $n^{th}$ baseband signal (n=1, 2, ..., N) by performing IFFT on a subblock #n. The $n^{th}$ baseband signal is multiplied by an $n^{th}$ carrier signal to produce an $n^{th}$ radio signal. After the N radio signals generated from the N subblocks are added, a CP is inserted by the CP insertion unit 314. The transmitter 80 of FIG. 11 may be used in a discontiguous carrier allocation situation where carriers allocated to the transmitter are not contiguous to each other.

Figure 12:
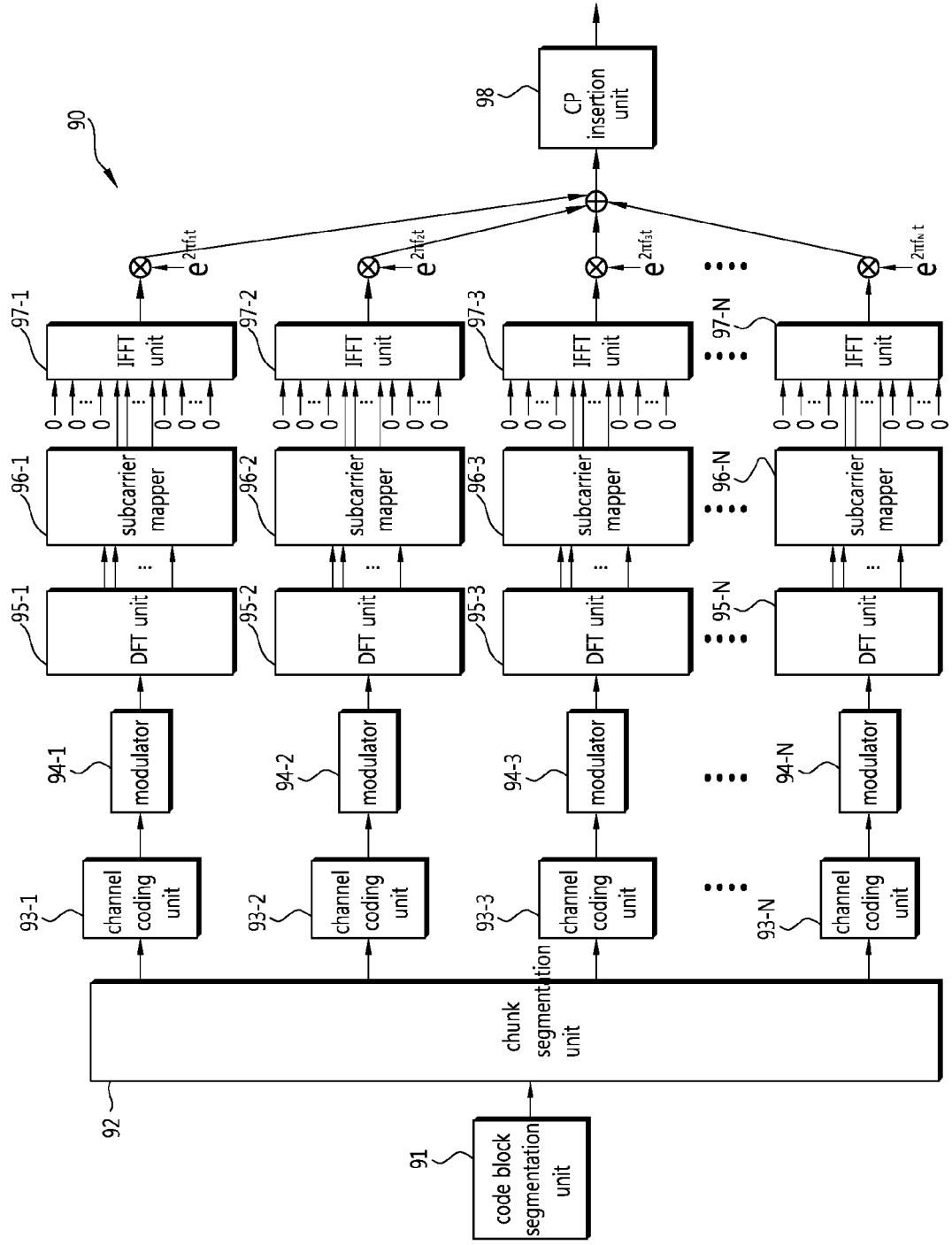
FIG. 12 is another example of a transmitter using the clustered DFT-s OFDM transmission scheme.

FIG. 12 is another example of a transmitter using the clustered DFT-s OFDM transmission scheme. FIG. 12 is a chunk-specific DFT-s OFDM system performing DFT precoding on a chunk basis. This may be called Nx SC-FDMA. Referring to FIG. 12, the transmitter 90 includes a code block division unit 91, a chunk division unit 92, a plurality of channel coding units 93-1, ..., 93-N, a plurality of modulators 94-1, ..., 4914-N, a plurality of DFT units 95-1, ..., 95-N, a plurality of subcarrier mappers 96-1, ..., 96-N, a plurality of IFFT units 97-1, ..., 97-N, and a CP insertion unit 98. Here, N may be the number of multiple carriers used by a multi-carrier transmitter. Each of the channel coding units 93-1, ..., 93-N may include a scramble unit (not shown). The modulators 94-1, ..., 94-N may also be called modulation mappers. The transmitter 90 may further include a layer mapper (not shown) and a layer permutator (not shown) which may be placed in front of the DFT units 95-1, ..., 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontiguous carrier allocation situation or a contiguous carrier allocation situation.

Figure 13:
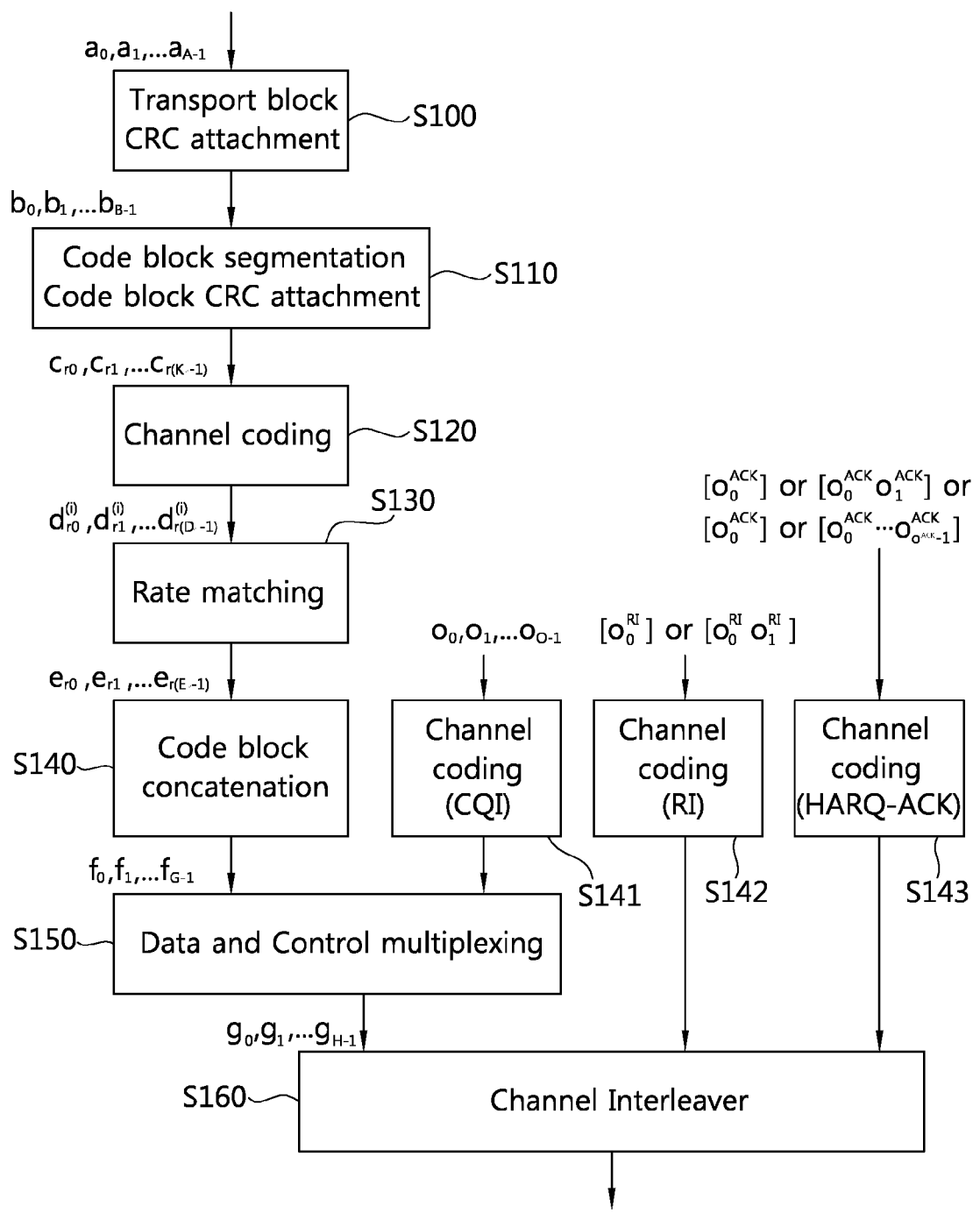
FIG. 13 is an exemplary process of handling an uplink shared channel (UL-SCH) transport channel.

FIG. 13 is an exemplary process of handling an uplink shared channel (UL-SCH) transport channel. Data is delivered to a coding unit in a format of at most one transport block for each transmission time interval (TTI). The process of handling the UL-SCH transport channel of FIG. 13 is also applicable to each UL-SCH transport channel of each UL cell.

Referring to FIG. 13, in step S100, a cyclic redundancy check (CRC) is attached to a transport block. By attaching the CRC, error detection can be supported. A size of the transport block may be denoted as A, a size of a parity bit may be denoted as L, and B may be defined as B=A+L.

In step S110, the CRC-attached transport block is segmented into a plurality of code blocks, and a CRC is attached to each code block. A size of each code block may be denoted as Kr, where r is a code block number.

In step S120, channel coding is performed on each code block. In this case, the channel coding can be performed using a turbo coding scheme. Since a coding rate of the turbo coding is ⅓, three coded streams are generated. Each coded stream having a code block number r has a size of Dr.

In step S130, rate matching is performed on each channel-coded code block. When the code block number is r, the number of rate-matched bits can be expressed as Er.

In step S140, the respective rate-matched code blocks are concatenated with each other. G denotes the total number of bits for the concatenated code blocks. Herein, a bit used for control information transmission is excluded from a given transport block on $N_L$ transport layers. In this case, the control information can be multiplexed with UL-SCH transmission.

In step S141 to step S143, channel coding is performed on the control information. The control information may include channel quality information including a CQI and/or a PMI, an HARQ-ACK, an RI, etc. It is assumed hereinafter that the CQI includes the PMI. For each piece of control information, a different coding rate is applied according to the number of different coding symbols. When the control information is transmitted through a PUSCH, channel coding is independently performed on the CQI, the RI, and the HARQ-ACK. Although it is assumed in the present embodiment that the CQI, the RI, and the HARQ-ACK are channel-coded respectively in step S141, step S142, and step S143, the present invention is not limited thereto.

In step S150, data and control information are multiplexed. In this case, HARQ-ACK information exists in both of two slots of a subframe, and can be mapped to resources around a demodulation reference signal (DMRS). By multiplexing the data and the control information, the data and the control information can be mapped to different modulation symbols. Meanwhile, when one or more UL-SCH transport blocks are transmitted in a subframe of a UL cell, CQI information can be multiplexed with data on a UL-SCH transport block having a highest modulation and coding scheme (MCS).

In step S160, channel interleaving is performed. The channel interleaving can be performed in association with PUSCH resource mapping. By the channel interleaving, a modulation symbol can be time-first mapped in a transmit waveform. HARQ-ACK information can be mapped to resources around a UL DMRS. RI information can be mapped around resources used by the HARQ-ACK information.

Figure 14:
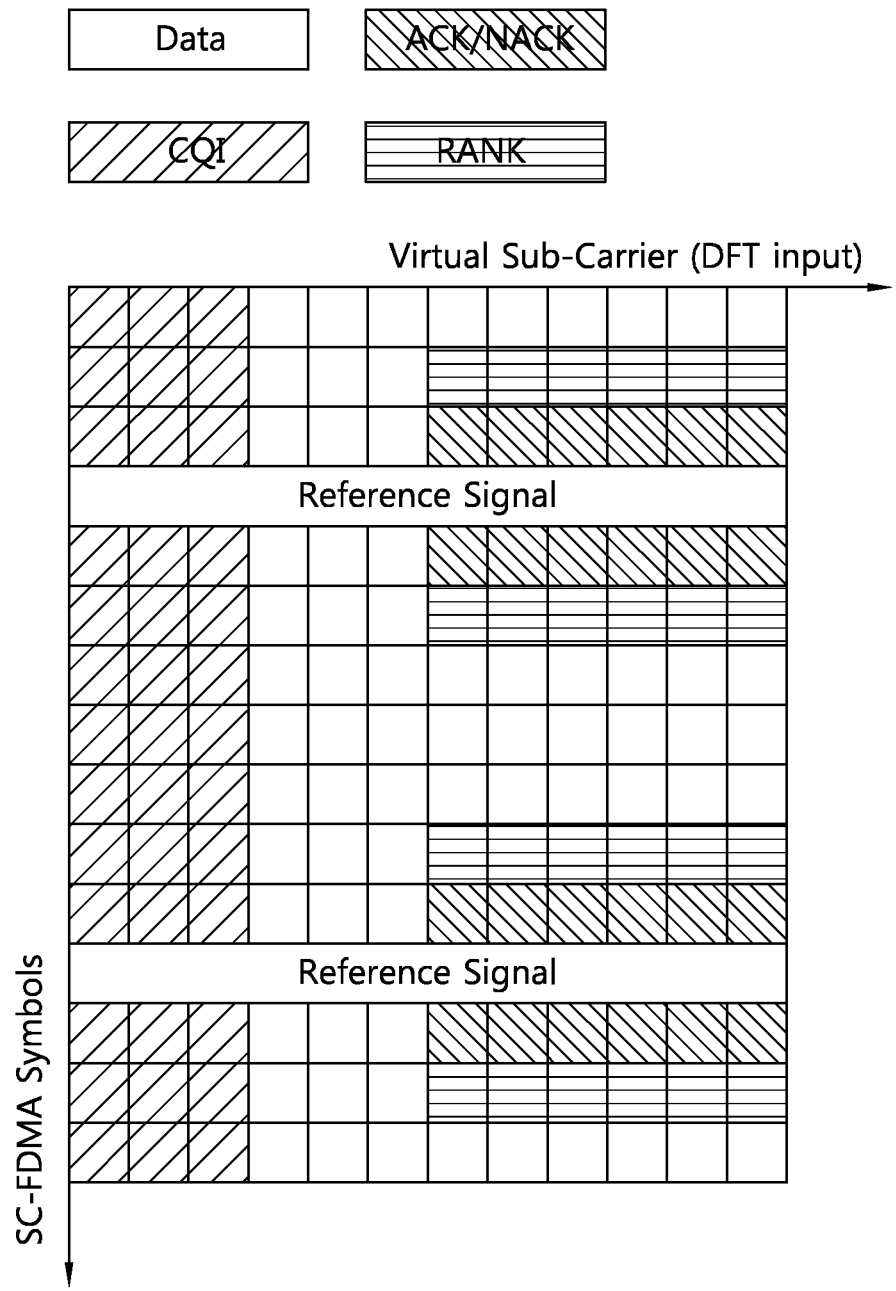
FIG. 14 shows an example of a physical resource element to which a data channel and a control channel are mapped in 3GPP LTE.

FIG. 14 shows an example of a physical resource element to which a data channel and a control channel are mapped in 3GPP LTE. A horizontal axis denotes a virtual subcarrier which is an input of discrete Fourier transform (DFT). A vertical axis denotes an SC-FDMA symbol. A reference signal is mapped to a $4^{th}$ SC-FDMA symbol of each slot. Data and a CQI are mapped in a time-first manner. The data and the CQI can be multiplexed in a serial link manner. An encoded HARQ-ACK is mapped to an SC-FDMA symbol located next to the SC-FDMA symbol to which the reference signal is mapped. A resource used for the HARQ-ACK may be located in a last portion of a virtual subcarrier. HARQ-ACK information may exist in both of two slots in a subframe. Irrespective of whether the HARQ-ACK is transmitted, an RI can be rate-matched next to a resource element to which the HARQ-ACK is mapped. The maximum number of SC-FDMA symbols to which the HARQ-ACK and the RI are mapped may be 4.

Figure 15:
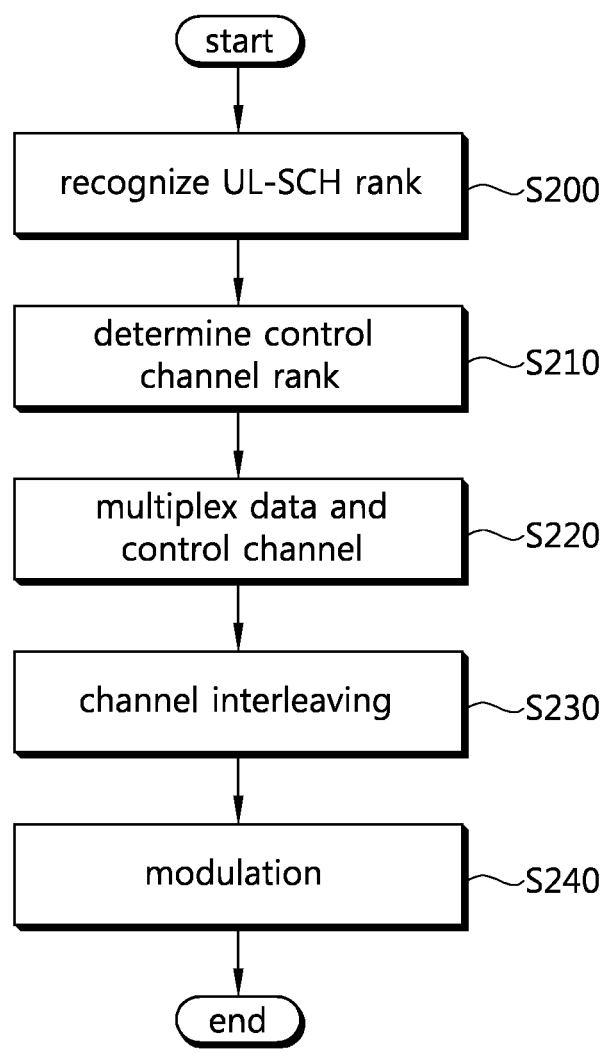
FIG. 15 is another exemplary process of handling a UL-SCH transport channel.

FIG. 15 is another exemplary process of handling a UL-SCH transport channel. In step S200, a UE recognizes an RI of a UL-SCH. In step S210, the UE determines a rank of the UL-SCH to a rank of a control channel. In this case, the number of information bits of the control channel may be extended according to the rank of the control channel. The number of information bits of the control channel can be extended by using simple repetition or a circular buffer. For example, if the information bit is [a0 a1 a2 a3] and the number of ranks is 2, the extended information bits may be [a0 a1 a2 a3 a0 a1 a2 a3] by using the simple repetition. By limiting the rank of the control channel to the rank of the data channel, a signaling overhead can be avoided. Since a DMRS is precoded by using the same precoding as that used in a data part, if the rank of the control channel differs from the rank of the data channel, additional signaling may be necessary for a PMI for the control channel. In this case, even if the number of effective ranks of the control channel is 1, the rank of the control channel can be determined to be equal to the rank of the data channel.

In step S220, the UE multiplexes the data and the control channel. In step S230, the UE performs a channel interleaving process. In step S240, the UE modulates the data and the control channel by using a modulation scheme such as quadrature phase shift keying (QPSK), 16 quadrature amplitude modulation (QAM), 64 QAM, or the like according to an MCS table. The modulation scheme of step S240 can also be performed in any steps of the aforementioned process of handling the UL-SCH transport channel of FIG. 15. Subsequently, DFT, MIMO precoding, resource element mapping, etc., can be performed.

When assuming two codewords, channel coding is performed for each codeword, and rate matching is performed according to the given MCS table. An encoded information bit can be scrambled in a cell-specific, UE-specific, or codeword-specific manner. Subsequently, the codeword can be mapped to a layer. In this case, layer shifting or layer permutation can be performed.

3GPP LTE-A supports a carrier aggregation (CA) system. The CA system may refer to 3GPP TR 36.815 V9.0.0 (2010-03).

A carrier aggregation (CA) system implies a system that configures a wideband by aggregating one or more carriers having a bandwidth smaller than that of a target wideband when the wireless communication system intends to support the wideband. The CA system can also be referred to as other terms such as a bandwidth aggregation system, or the like. The carrier aggregation system can be divided into a contiguous carrier aggregation system in which carriers are contiguous to each other and a non-contiguous carrier aggregation system in which carriers are separated from each other. In the contiguous carrier aggregation system, a frequency spacing may exist between respective carriers. A carrier which is a target when aggregating one or more carriers can directly use a bandwidth that is used in the legacy system in order to provide backward compatibility with the legacy system. For example, a $3^{rd}$ generation partnership project (3GPP) long-term evolution (LTE) system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a user equipment (UE) can transmit or receive one or multiple carriers simultaneously according to capacity. An LTE-A UE can transmit or receive the multiple carriers simultaneously. An LTE Rel-8 UE can transmit or receive only one carrier when each of carriers constituting the carrier aggregation system is compatible with an LTE Rel-8 system. Therefore, when the number of carriers used in an uplink (UL) is equal to the number of carriers used in a downlink (DL), it is necessary to configure such that all component carriers (CCs) are compatible with the LTE Rel-8 system.

In order to efficiently use multiple carriers, the multiple carriers can be managed by media access control (MAC). In order to transmit/receive the multiple carriers, both a transmitter and a receiver must be able to transmit/receive the multiple carriers.

Figure 16:
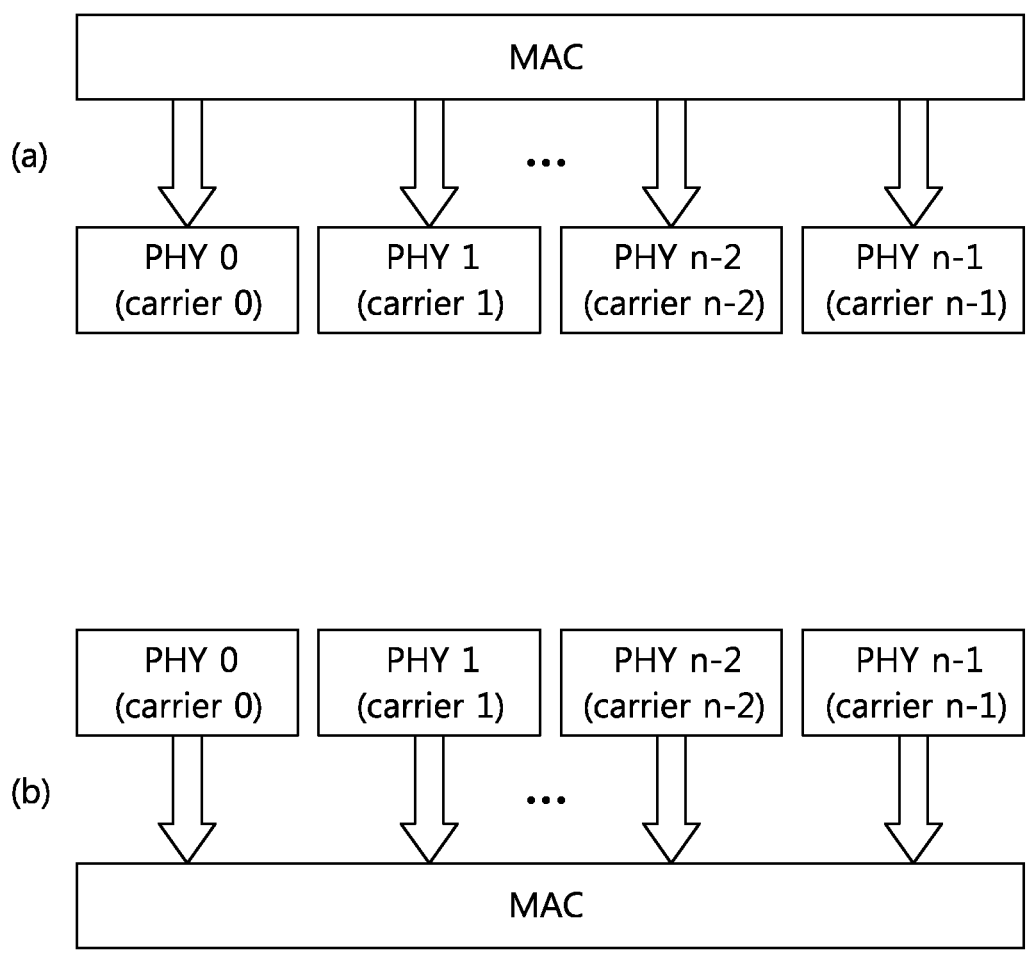
FIG. 16 shows an example of a transmitter and a receiver which constitute a carrier aggregation system.

FIG. 16 shows an example of a transmitter and a receiver which constitute a carrier aggregation system.

In the transmitter of FIG. 16(a), one MAC transmits and receives data by managing and operating all of n carriers. This is also applied to the receiver of FIG. 16(b). From the perspective of the receiver, one transport block and one HARQ entity may exist per CC. A UE can be scheduled simultaneously for multiple carriers. The carrier aggregation system of FIG. 16 can apply both to a contiguous carrier aggregation system and a non-contiguous carrier aggregation system. The respective carriers managed by one MAC do not have to be contiguous to each other, which results in flexibility in terms of resource management.

Figure 17:
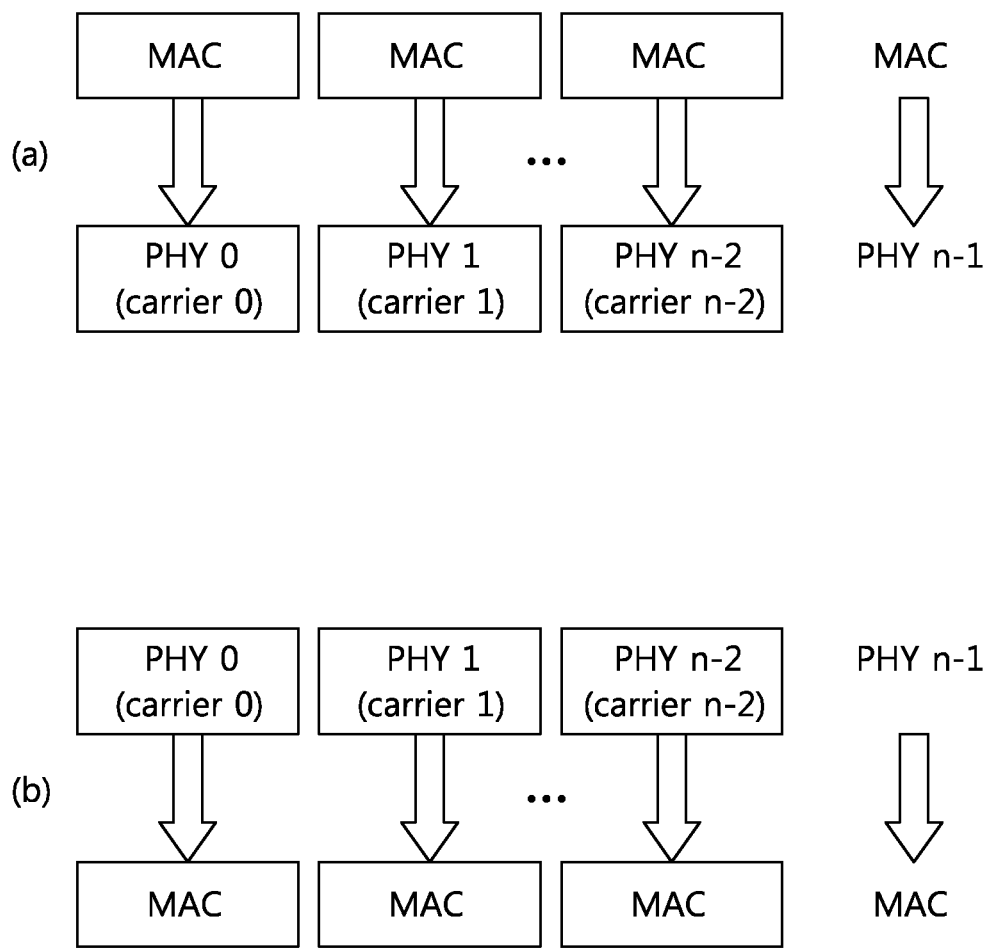
FIG. 17 and FIG. 18 show other examples of a transmitter and a receiver which constitutes a carrier aggregation system.
Figure 18:
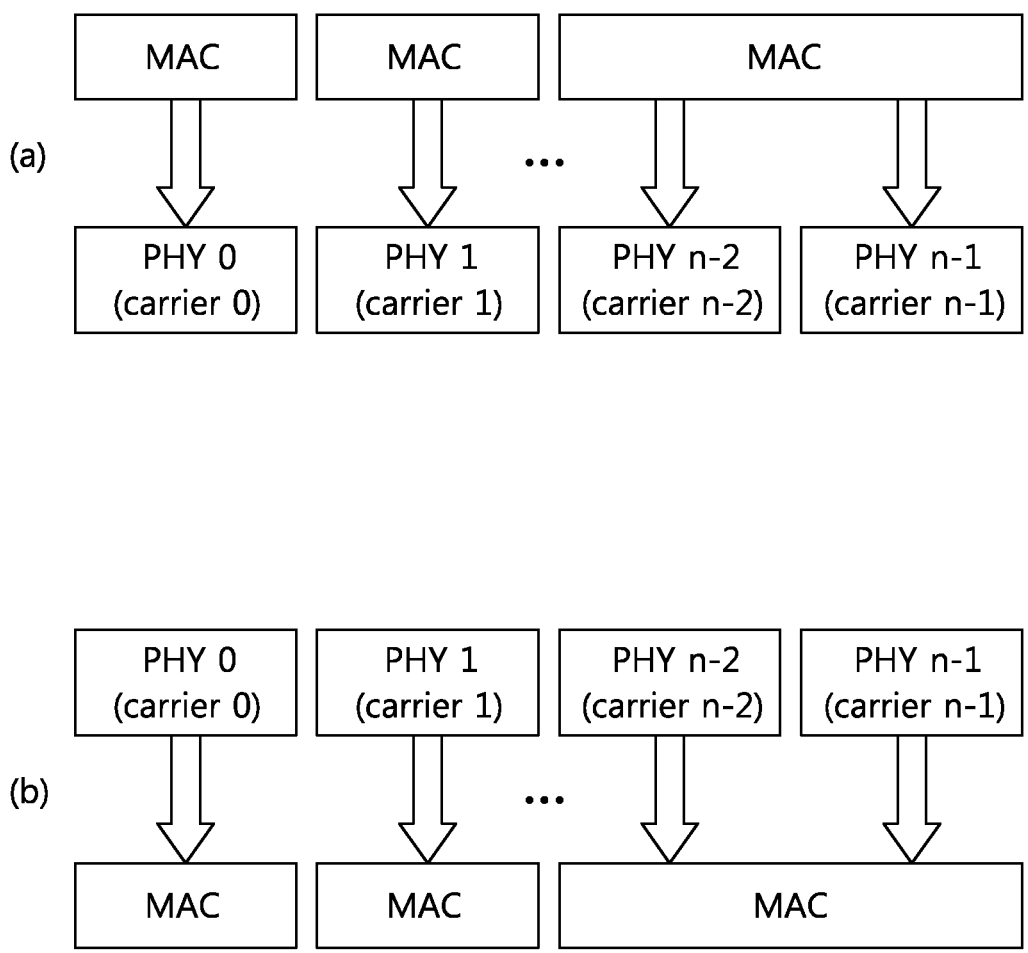

FIG. 17 and FIG. 18 show other examples of a transmitter and a receiver which constitutes a carrier aggregation system.

In the transmitter of FIG. 17(a) and the receiver of FIG. 17(b), one MAC manages only one carrier. That is, the MAC and the carrier are 1:1 mapped. In the transmitter of FIG. 18(a) and the receiver of FIG. 18(b), a MAC and a carrier are 1:1 mapped for some carriers, and regarding the remaining carriers, one MAC controls multiple carriers. That is, various combinations are possible based on a mapping relation between the MAC and the carrier.

The carrier aggregation system of FIG. 16 to FIG. 18 includes n carriers. The respective carriers may be contiguous to each other or may be separated from each other. The carrier aggregation system can apply both to a UL and a DL. In a TDD system, each carrier is configured to be able to perform UL transmission and DL transmission. In an FDD system, multiple carriers can be used by dividing them for a UL and a DL. In a typical TDD system, the number of CCs used in the UL is equal to that used in the DL, and each carrier has the same bandwidth. The FDD system can configure an asymmetric carrier aggregation system by allowing the number of carriers and the bandwidth to be different between the UL and the DL.

Meanwhile, the concept of a cell can be applied in the LTE-A system. The cell is an entity configured by combining at least one unit of DL resources and selectively included UL resources from the perspective of a UE. That is, one cell must include at least one unit of DL resources, but may not include UL resources. The one unit of DL resources may be one DL CC. A linkage between a carrier frequency of a DL resource and a carrier frequency of a UL resource can be indicated by an SIB2 transmitted using the DL resource. Although a component carrier (CC) will be taken as an example in the following descriptions of the present invention, it is apparent that the CC can be replaced with a cell.

A cell type can be classified according to an allocation method. First, the number of cells allocated to an entire system may be fixed. For example, the number of cells allocated to the entire system may be 8. All or some of the cells allocated to the entire system may be allocated by radio resource control (RRC) signaling of a higher layer. The cell allocated by the RRC signaling is called a configured cell. That is, the configured cell may imply a cell allocated to be usably by the system among the cells allocated to the entire system. All or some of the configured cells may be allocated by media access control (MAC) signaling. The cell allocated by the MAC signaling can be called an activated cell. Among the configured cells, the remaining cells other than the activated cell can be called a deactivated cell. All or some of the activated cells are allocated to the UE by using L1/L2 signaling. The cell allocated by using the L1/L2 signaling can be called a scheduled cell. The scheduling cell can receive data through a PDSCH by using a DL resource in a cell, and can transmit data through a PUSCH by using a UL resource.

Hereinafter, a transmission power control method proposed in the present invention will be described.

A periodic uplink control information (UCI) and an aperiodic channel quality indicator (CQI) can be transmitted through a plurality of UL CCs. The periodic UCI can be transmitted through a PUCCH or can be transmitted by being piggybacked on a PUSCH. By using the piggyback-type transmission, the UCI can be transmitted through the PUSCH without having to be transmitted through the PUCCH. Accordingly, multiple channels can be prevented from simultaneous transmission, and thus it is possible to prevent an increased peak-to-average power ratio (PAPR)/cubic metric (CM) problem or an inter-modulation distortion (IMD) problem. Meanwhile, total transmission power of the UE may be limited to a specific level, and if the periodic UCI and the aperiodic CQI are transmitted through a PUSCH or PUCCH allocated to a plurality of UL CCs, transmission power for each UL channel may also be limited. In this case, how to control the transmission power of each UL channel, that is, a method of setting a priority when allocating the transmission power to each UL channel, can be proposed. Hereinafter, the proposed transmission power control method will be described according to an embodiment of the present invention. It is assumed hereinafter that the UCI includes both the periodic UCI and the aperiodic CQI.

First, a PUSCH transmitting the UCI may be prioritized over a PUSCH not transmitting the UCI. In addition, a PUCCH may be prioritized over the PUSCH transmitting the UCI. Transmission power of a PUSCH on which the UCI is not piggybacked may be first scaled down, and occasionally, transmission power of the PUSCH on which the UCI is not piggybacked may be zero. A priority of the PUCCH, the PUSCH transmitting the UCI and the PUSCH not transmitting the UCI may be applied irrespective of whether using the same UL CC or different UL CCs.

In addition, the priority is also applicable to a case in which the PUCCH and the PUSCH transmitting the UCI are transmitted simultaneously.

If a sum of transmission powers of respective UL channels including the PUCCH and the PUSCH exceeds maximum transmission power of the UE, the UE can scale down the transmission power of each PUSCH to satisfy Equation 1 below.

$$\sum_c w_c \cdot P_{PUSCHc}(i) \le P_{CMAX} - P_{PUCCH}(i) \qquad \langle \text{Equation 1} \rangle$$

In Equation 1, $w_c$ is a scaling factor for transmission power of a PUSCH in a UL CC having an index c. $P_{PUSCHc}(i)$ is transmission power of each PUSCH, $P_{CMAX}$ is maximum transmission power of a UE, and $P_{PUCCH}(i)$ is transmission power of a PUCCH. That is, the scaling factor $w_c$ can be applied to the transmission power of the PUSCH so that a sum of transmission powers of the respective PUSCHs does not exceed a value obtained by subtracting the transmission power of the PUCCH from the maximum transmission power of the UE according to Equation 1. The scaling factor can be applied to the transmission power of the PUSCH on which the UCI is not transmitted.

Quality of service (QoS) of data transmitted through the PUSCH of a UL CC may depend on mapping to a physical resource of a logical channel. Scaling of transmission power may depend on a current power control status of each UL CC that can be known only to the UE. In addition, a maximum tolerable power difference between channels can be considered. Such aspects can be considered in the implementation of the UE. Meanwhile, there is a need to minimize a case in which transmission power of a UL channel is decreased due to an influence of a scaling factor according to a suitable scheduler and a power control scheme. In particular, there is a need to minimize the influence of the scaling factor $w_c$ applied to the transmission power of the PUSCH when performing HARQ. For this, equal scaling, TF-dependent scaling, etc., can be considered when determining the scaling factor $w_c$.

In addition, the proposed transmission power control method is also applicable to a case in which a UCI is transmitted through one or more PUSCHs on a given UL subframe. That is, this is a case in which a plurality of PUSCHs are allocated respectively to a plurality of UL CCs in one given UL subframe, and a periodic UCI, an aperiodic CQI, or and a jointly encoded periodic UCI and aperiodic CQI is transmitted through the plurality of PUSCHs. If the number of PUSCHs for transmitting the UCI is one, as described above, transmission power which remains after subtracting the transmission power of the PUCCH from the maximum transmission power $P_{CMAX}$ of the UE can be allocated as the transmission power of the PUSCH. In this case, the transmission power of the PUSCH transmitting the UCI may be allocated more preferentially than the transmission power of the PUSCH not transmitting the UCI, and the scaling factor $w_c$ is applicable to the transmission power of the PUSCH.

A similar method may also be applicable to a case in which the UCI is transmitted through a plurality of PUSCHs. The transmission power which remains after subtracting the transmission power of the PUSCH from the maximum transmission power $P_{CMAX}$ of the UE can be allocated as the transmission power of the PUSCH. Scaling down of transmission power can be first performed on the PUSCH not transmitting the UCI, and the remaining transmission power can be allocated by being distributed to a plurality of PUSCHs transmitting the UCI. Transmission power of each PUSCH can be evenly distributed when the transmission power is distributed to the plurality of PUSCHs transmitting the UCI, or transmission power can be distributed by setting a priority for the plurality of PUSCHs transmitting the UCI. For example, a PUSCH allocated to a UL primary CC (PCC) may be prioritized over a PUSCH allocated to another UL CC. This is because a scheduling request (SR) signal and an ACK/NACK signal which are relatively important among periodic UCIs are transmitted on the UL PCC. That is, scaling down of transmission power is first performed on a PUSCH allocated not to the UL PCC but to another UL CC, and the remaining transmission power can be allocated to a PUSCH allocated to the UL PCC.

If the PUSCH is not allocated to the UL PCC, a priority of the transmission power of the plurality of PUSCHs can be determined by using various methods. For example, a priority of a PUSCH to which transmission power is allocated can be dynamically set through PDCCH signaling. The priority of the PUSCH can be set semi-statically through higher layer signaling. Alternatively, the priority of the plurality of PUSCHs can be implicitly set without additional signaling. In this case, the priority can be set in a lowest or highest order of a physical CC index or a logical CC index of a UL CCs to which the PUSCH for transmitting the UCI is allocated. Alternatively, the priority can be set according to a size of a transmission block (TB). For example, the priority can be set in a descending order of a size of scheduled UL resources of the UL CC or in a descending order of a modulation and coding scheme (MCS) level of the UL CC. Alternatively, the priority can be set on the basis of quality of service (QoS) of UL CCs to which the PUSCH for transmitting the UCI is allocated. In this case, the QoS for the UL CC can be reported by a BS.

If a periodic UCI and an aperiodic CQI are transmitted simultaneously through a plurality of UL CCs in one subframe additionally given, transmission power of a PUSCH for transmitting the aperiodic CQI may be prioritized over transmission power of a PUSCH for transmitting the periodic UCI. That is, transmission power of the PUSCH for transmitting the periodic UCI may be first scaled down. This is because a signal for triggering an aperiodic CQI is transmitted through a UL grant, and an aperiodic CQI for a corresponding DL CC is more important than the periodically transmitted UCI from the perspective of a network.

Figure 19:
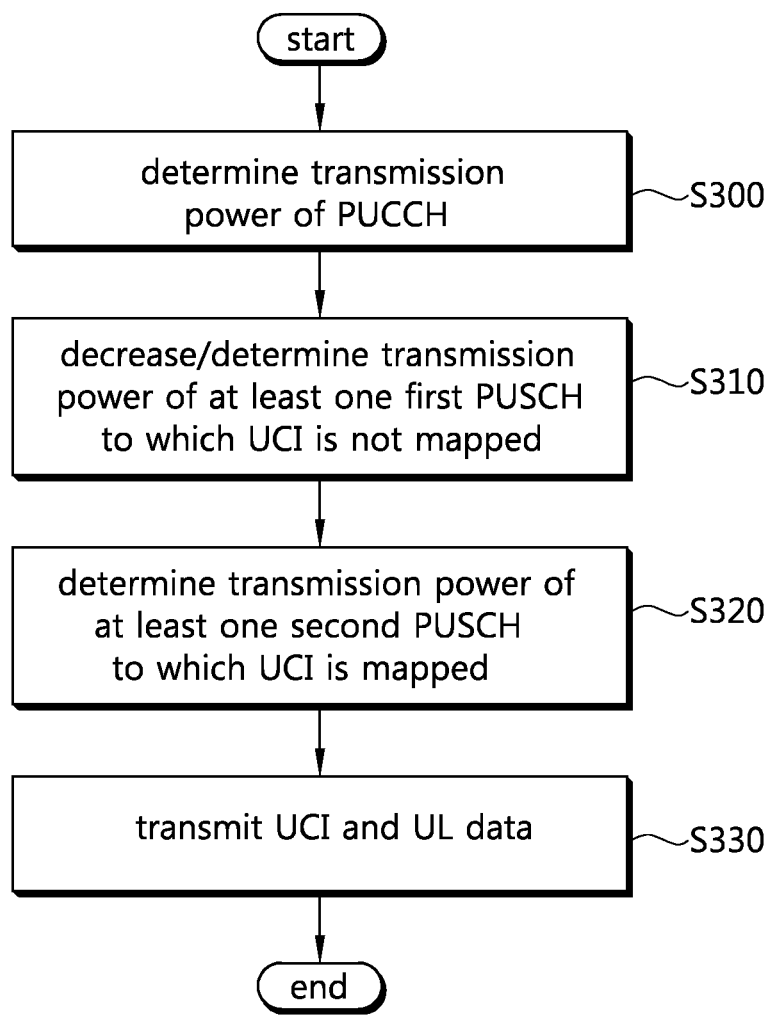
FIG. 19 shows the proposed transmission power control method according to an embodiment of the present invention.

FIG. 19 shows the proposed transmission power control method according to an embodiment of the present invention.

In step S300, a UE determines transmission power of a PUCCH. In step S310, the UE determines transmission power of at least one first PUSCH to which a UCI is not mapped among a plurality of PUSCHs by scaling down the transmission power on the basis of maximum transmission power and the transmission power of the PUCCH. In this case, Equation 1 can be applied. In step S320, the UE determines transmission power of at least one second PUSCH among the plurality of PUSCHs. In step S330, the UE transmits the UCI and UL data through the PUCCH, the at least one first PUSCH, and the at least one second PUSCH. The at least one first PUSCH and the at least one second PUSCH are allocated to a plurality of UL CCs, and transmission power of each UL channel can be determined according to the aforementioned various transmission power control methods.

Figure 20:
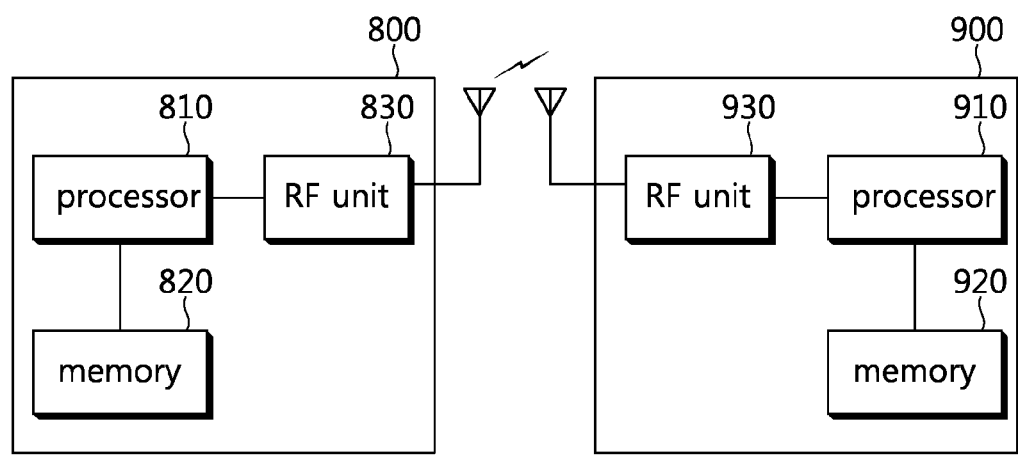
FIG. 20 is a block diagram showing wireless communication system to implement an embodiment of the present invention.

FIG. 20 is a block diagram showing wireless communication system to implement an embodiment of the present invention.

ABS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of controlling transmission power by a terminal in a wireless communication system, the method comprising:

determining transmission power of a physical uplink control channel (PUCCH);

determining transmission power of at least one first uplink shared channel (PUSCH) to which an uplink control information (UCI) is not mapped by scaling down the transmission power thereof among a plurality of PUSCHs on the basis of maximum transmission power of the terminal and the transmission power of the PUCCH;

determining transmission power of at least one second PUSCH to which the UCI is mapped among the plurality of PUSCHs; and transmitting the UCI and uplink (UL) data through the PUCCH, the at least one first PUSCH, and the at least one second PUSCH, wherein the at least one first PUSCH and the at least one second PUSCH are allocated to a plurality of UL component carriers (CCs).

2. The method of claim 1, wherein the transmission power of the at least one first PUSCH is determined by being scaled down to satisfy the equation of:

$$\sum_c w_c \cdot P_{PUSCHc}(i) \le P_{CMAX} - P_{PUCCH}(i),$$

where $w_c$ is a scaling factor for scaling down the transmission power of the at least one first PUSCH, c is an index of a UL CC, $P_{PUSCHc}(i)$ is the transmission power of the at least one first PUSCH, $P_{CMAX}$ is the maximum transmission power of the terminal; and $P_{PUCCH}(i)$ is the transmission power of the PUCCH.

3. The method of claim 1, wherein the UCI is any one of a periodic UCI, an aperiodic channel quality indicator (CQI), and a jointly encoded periodic UCI and aperiodic CQI.

4. The method of claim 1, wherein the transmission power of the at least one second PUSCH is evenly distributed to the at least one second PUSCH.

5. The method of claim 1, wherein the transmission power of the at least one second PUSCH is allocated to the at least one second PUSCH on the basis of a pre-set priority.

6. The method of claim 5, wherein the transmission power of the second PUSCH allocated to a UL primary CC (PCC) is preferentially allocated among the at least one second PUSCH.

7. The method of claim 5, wherein the priority is set explicitly by physical downlink control channel (PDCCH) signaling or radio resource control (RRC) signaling.

8. The method of claim 5, wherein the priority is set implicitly on the basis of a size of a transmission block (TB) or an index of a plurality of UL CCs to which the at least one second PUSCH is allocated.

9. The method of claim 5, wherein the transmission power of the second PUSCH to which an aperiodic CQI is mapped is preferentially allocated among the at least one second PUSCH.

10. A terminal in a wireless communication system, the terminal comprising:
a radio frequency (RF) unit for transmitting or receiving a radio signal; and
a processor coupled to the RF unit,
wherein the processor is configured for:
determining transmission power of a physical uplink control channel (PUCCH);
determining transmission power of at least one first uplink shared channel (PUSCH) to which an uplink control information (UCI) is not mapped by scaling down the transmission power thereof among a plurality of PUSCHs on the basis of maximum transmission power of the terminal and the transmission power of the PUCCH;
determining transmission power of at least one second PUSCH to which the UCI is mapped among the plurality of PUSCHs; and
transmitting the UCI and uplink (UL) data through the PUCCH, the at least one first PUSCH, and the at least one second PUSCH,
wherein the at least one first PUSCH and the at least one second PUSCH are allocated to a plurality of UL component carriers (CCs).

11. The terminal of claim 10, wherein the transmission power of the at least one first PUSCH is determined by being scaled down to satisfy the equation of:

$$\sum_c w_c \cdot P_{PUSCHc}(i) \le P_{CMAX} - P_{PUCCH}(i),$$

where $w_c$ is a scaling factor for scaling down the transmission power of the at least one first PUSCH, c is an index of a UL CC, $P_{PUSCHc}(i)$ is the transmission power of the at least one first PUSCH, $P_{CMAX}$ is the maximum transmission power of the terminal, and $P_{PUCCH}(i)$ is the transmission power of the PUCCH.

12. The terminal of claim 10, wherein the UCI is any one of a periodic UCI, an aperiodic channel quality indicator (CQI), and a jointly encoded periodic UCI and aperiodic CQI.

13. The terminal of claim 10, wherein the transmission power of the at least one second PUSCH is evenly distributed to the at least one second PUSCH.

14. The terminal of claim 10, wherein the transmission power of the at least one second PUSCH is allocated to the at least one second PUSCH on the basis of a pre-set priority.

* * * * *